United States Patent [19]

Maerz et al.

[11] Patent Number: 4,938,553
[45] Date of Patent: Jul. 3, 1990

[54] ARRANGEMENT FOR AN INTEGRATED OPTICAL SPECTROMETER AND THE METHOD FOR MANUFACTURING THE SPECTROMETER

[75] Inventors: Reinhard Maerz; Cornelius Cremer, both of Munich, Fed. Rep. of Germany

[73] Assignee: Siemens Aktiengesellschaft, Berlin and Munich, Fed. Rep. of Germany

[21] Appl. No.: 168,384

[22] Filed: Mar. 15, 1988

[30] Foreign Application Priority Data

Mar. 16, 1987 [DE] Fed. Rep. of Germany ....... 3708526

[51] Int. Cl.$^5$ ................................................ G02B 6/12
[52] U.S. Cl. .............................. 350/96.11; 350/96.12; 350/96.19; 350/162.2; 350/162.24
[58] Field of Search ............... 350/96.11, 96.12, 96.13, 350/96.14, 96.15, 96.19, 162.17, 162.2, 162.22, 162.24; 372/102

[56] References Cited

U.S. PATENT DOCUMENTS

| | | |
|---|---|---|
| 4,274,706 | 6/1981 | Tangonan ...................... 350/96.19 |
| 4,518,219 | 5/1985 | Leonburger et al. ........... 350/96.12 |
| 4,693,543 | 9/1987 | Matsumura et al. ............ 350/96.11 |
| 4,715,027 | 12/1987 | Mahapatra et al. .................... 370/3 |
| 4,740,951 | 4/1988 | Lizet et al. ............................ 370/3 |
| 4,744,618 | 5/1988 | Mahlein ......................... 350/96.19 |
| 4,750,801 | 6/1988 | Alferness ....................... 350/96.12 |
| 4,776,661 | 10/1988 | Handa ............................ 350/96.19 |

OTHER PUBLICATIONS von Lingelsheim, "Planar Optical Demultiplexer with Chirped Grating for WDM Fibre Systems", *IEE Proceedings;* vol. 131, Pt. H, No. 5, Oct. 1984, pp. 290-294.
Siegman, "ABCD-Matrix Elements for a Curved Diffraction Grating", *Josa Communications,* vol. 2, No. 10, Oct. 1985.
Macfayden et al., *Electronics Letters,* vol. 16, No. 11, May 22, 1980, "Waisted-Rib Optical Waveguides in GaAs", pp. 440-441.
Tamir et al., *Appl. Phys.,* 14, pp. 235-254, 1977, Springer-Verlag, "Analysis and Design of Grating Couplers".
"The Optical Industry & Systems Purchasing Directory" from the Publishers of Optical Spectra Magazine, PD 34, 1982, 28th Edition.

*Primary Examiner*—Frank Gonzalez
*Attorney, Agent, or Firm*—Hill, Van Santen, Steadman & Simpson

[57] ABSTRACT

An arrangement for an integrated optical spectrometer having an optical film waveguide and a focusing optical grating with grating lines extending perpendicular to a plane of the film waveguide characterized by the grating having a fixed grating constant so that adjustment and contrast problems can be avoided. The new arrangement can take the form of a film waveguide in coaction with a ribbed waveguide disposed thereon, with the grating being formed in the edges of the ribbed waveguide.

9 Claims, 2 Drawing Sheets

ARRANGEMENT FOR AN INTEGRATED OPTICAL SPECTROMETER AND THE METHOD FOR MANUFACTURING THE SPECTROMETER

BACKGROUND OF THE INVENTION

The present invention is directed to an arrangement for an integrated optical spectrometer, which arrangement has an optical film waveguide extending in a plane and a focusing, optical grating with the grating lines extending essentially vertical to the plane of the film waveguide and to a method of manufacturing the arrangement.

Arrangements for integrated optical spectrometers, which have component parts that focus the light of different wavelengths onto different points, are of interest for wavelength multiplexers and demultiplexers in optical communication technology and are also of interest for sensor applications. An arrangement having a film waveguide and a focusing, optical grating with the grating lines being essentially vertical to the plane of the film waveguide is disclosed in an article from *IEE Proceedings*, Vol. 131.Pt. H. No. 5, October 1984, pages 290–294. In this arrangement, an input fiber and a plurality of output fibers are butt coupled at an end face of a film waveguide. A focusing, optical grating, whose grating lines proceed essentially vertically to the plane of the film waveguide is arranged at the opposite end face of this film waveguide. The grating constant of this grating is not fixed but varied. Such a grating is known as a "grating with a chirp". The varying grating constant or, respectively, the chirp is selected so that a defined wavelength from an input fiber will be focused onto a particular output fiber.

SUMMARY OF THE INVENTION

The object of the present invention is to provide a new arrangement of a film waveguide having a focusing, optical grating, wherein the grating will have a fixed grating constant so that adjustment problems and contrast problems will be avoided.

This object is achieved by an improvement in an arrangement for an integrated optical spectrometer, said arrangement comprising an optical film waveguide extending in a plane, and a focusing, optical grating, said grating having grating lines extending essentially perpendicular to the plane of the film waveguide. The improvement is that the focusing, optical grating is fashioned as a longitudinally limiting surface of a ribbed waveguide that defines a step, the film waveguide is adjacent at least to one side of the ribbed waveguide.

The arrangement of the present invention is a first proposal for an integrated optical spectrometer wherein the diffracted light from a ribbed waveguide can be coupled into a film waveguide and the light of different wavelengths can be focused onto different points. As a result of the planar structure, the problems of focusing can be displaced from the known chirp of the grating onto a curved course of the ribbed waveguide. Since both the definition of the focal points, as well as the placement of the additional component parts, for example of photodiodes at these focal points, can be realized with a mask exposure, the adjustment problems, which occur in a holographic grating generation, can, thus, be avoided.

The functioning of the arrangement of the invention is based on the light diffraction at the grating. For a given wavelength, it is essentially characterized by an out-coupling direction and by the coupling coefficient for the various diffraction orders. In this respect, see the article from *Applied Physics*, Vol. 14, 1977, pages 235–254.

Specifically given a radiation incidence from a plane relative whereto the grating lines extend essentially perpendicular, the out coupling direction in which the light is diffracted also lies in this plane. Applied to a rib waveguide, this means that a grating in or on a longitudinal limiting surface of the ribbed waveguide that forms a lateral side wall or, respective, steps of the waveguide essentially leads to an out-coupling into the laterally adjacent film waveguide. This estimation can be substantially based on the fact that the film waveguide in the near field of the grating lines, usually fashioned as furrows, joins in the longitudinal limiting surface of the ribbed waveguide so that the phase fronts still proceed parallel to the furrows.

When, moreover, the film waveguide is present at only one longitudinal side, and not at the other longitudinal side of the ribbed waveguide as well, then, for a defined range of grating constants, no energy can be emitted at the side of the ribbed waveguide at which no film waveguide is located.

An estimate of the coupling coefficient, according to the equations of Tamir et al, as disclosed in the above-mentioned article from *Applied Physics*, shows that the coupling for a 0.1 $\mu$m corrugation depth should lie on the order of a magnitude of 0.5/mm for InGaAsP.

The radiant energy coupled laterally from the ribbed waveguide is emitted in different directions for different wavelengths. The preferred embodiment of the arrangement of the invention has a constant grating constant and has the ribbed waveguide curved essentially corresponding to a section of a logarithmic spiral, at least for a length of the gratings. This preferred embodiment is based on the perception that the ribbed waveguide that usually comprises a constant width can be curved such that for a definite wavelength $\lambda_0$, the energy emitted at an allocated angle $\lambda_0$ is focused onto a focal point $F_0$. The curve shape that performs this for equal distant grating lines along the ribbed waveguide is the logarithmic spiral. Its origin is the focal point $F_0$ of the radiation of the wavelength $\lambda_0$. For gratings having a fixed grating constant a, the curvature of the ribbed waveguide will produce a slight chirp that can be corrected by modifications of the curved shape.

The arrangement of the invention is not limited to a logarithmic spiral. Fundamentally, every curve shape is allowable. For every selected curve shape, however, a grating having an allocated chirp must then be employed, at which the same conditions are then present as in the grating with a fixed grating constant on a logarithmic spiral.

The special advantage of the arrangement of the invention, however, lies precisely wherein the grating having fixed grating constant can be used. This structure is planar and this makes the integration of photodiodes, waveguides, etc., possible.

Preferred developments of the arrangement of the invention are that a respective grating is provided along both longitudinal limiting surfaces of the ribbed waveguide, and each of these define a step and that the two gratings reside opposite one another.

Another preferred development is that both the film waveguide, as well as the ribbed waveguide, are monomode waveguides.

An especially advantageous method for manufacturing the arrangement of the invention comprises providing a layer on a substrate, providing a covered layer on the layer, providing a surface grating on the covered layer, partially covering the surface grating with an etching mask whose contour corresponds in plan view to the waveguide being produced with the lateral limiting surfaces, etching the exposed part of the surface of the covering layer to a thickness greater than the thickness of the covering layer to impose the surface grating on the lower depths and then selectively removing the cover layer. Preferably, the layer is a group of layers comprises a first layer for the film waveguide, an intermediate layer, and then a outer layer for the ribbed waveguide, the etching mask has a contour that corresponds to the ribbed waveguide. In the first transfer step the exposed parts of the cover layer are etched to a thickness, which is less than the total thickness of the three layers, and the exposed part of the surface grating is transferred onto the lower depth alongside the ribbed waveguide, which was defined by the etching mask. A second mask is provided and a second etching step of the exposed portions of the surface grating is preformed to transfer the grating to the lower depth, which is at least equal to the sum of the thickness of the cover layer, and the thickness of the three layers providing for the ribbed waveguide and film waveguide.

This method allows the arrangement of the invention to be manufactured as simply as possible without the necessity of mechanically working at the substrate. This method is based on the perception that when transferring a surface grating by etching, particularly by dry etching, this grating is also transferred onto steps or side walls that arise during the etching process and separate higher-lying mask regions of the surface grating from the regions transferred to the new depth. It is desirable for the etching that the exposed portion of the cover layer transfers the surface grating at least to a depth down to the underside of the layer forming the particular waveguide, and that this is done by a dry etching process. The provided layers, such as the first layer for the film waveguide and the third layer for the ribbed waveguide, are formed of the same material. Preferably, these layers are formed of InGaAsP, and the cover layer, as well as the intermediate layers, are composed of InP.

The method of the invention can also allow for a manufacturing arrangement for an integrated-optical spectrometer of the type which was disclosed in the above-mentioned article from *IEE Proceedings*, wherein the arrangement is manufactured according to the method of the invention differs from the known arrangements by a feature which is that the lateral limiting surface of the film waveguide defines a step into which the focusing grating is etched. Preferably, the limiting surface proceeds in a curved path in the plane of the film waveguide, and the lateral limiting surface of the film waveguide proceeds according to the logarithmic spiral.

Other advantages and features of the present invention will be readily apparent from the following description of the preferred embodiments, the drawings and claims.

DESCRIPTION OF THE PREFERRED EMBODIMENTS

Figure 1:
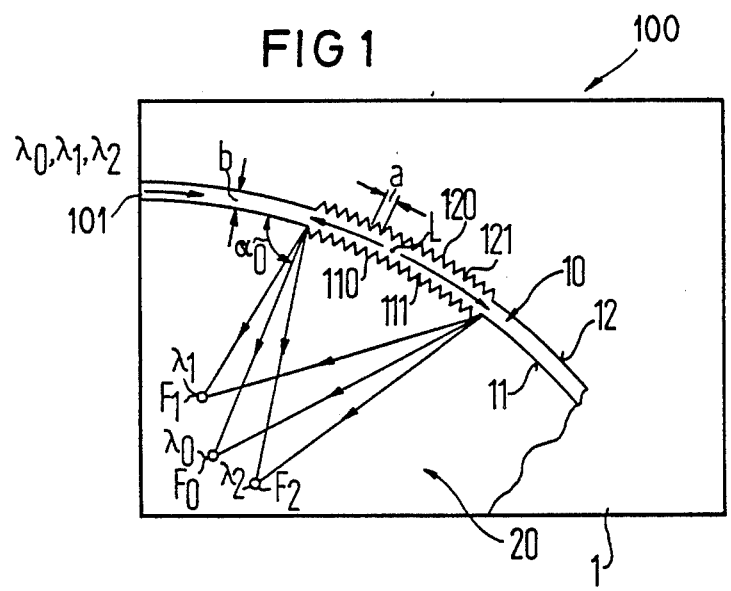
FIG. 1 is a plan view, with portions broken away, of an arrangement having a film waveguide and a curved, ribbed waveguide to schematically illustrate the separations of light having different wavelengths.

The principles of the present invention are particularly useful when incorporated in an arrangement or a device generally illustrated at 100 in FIG. 1. The device 100 has a ribbed waveguide 10 and a film waveguide 20, which is adjacent thereto on one long side, with the waveguides 10 and 20 being arranged on a common substrate 1. The plane of the film waveguide 20, as well as the ribbed waveguide 10, is parallel to the plane of the drawing and the ribbed waveguide 10 proceeds in a curved path in this plane and has two longitudinal limiting surfaces 11 and 12 that define steps or side walls.

A grating 110 is formed in a side wall 11 and a grating 120 is formed in the side wall 12. These gratings have grating lines 111 and 121, respectively, which are formed of furrows that extend perpendicular to the plane of the drawing. The two gratings 110 and 120 reside opposite one another and have an overall length L. A grating constant a of both gratings 110 and 120 is fixed.

The film waveguide 20 is adjacent the ribbed waveguide 10 at the long side of which the limiting surface 11 is situated, for example, is adjacent over the full length of the ribbed waveguide 10.

The wavelengths to be separated, for example the wavelengths $\lambda_0$, $\lambda_1$ and $\lambda_2$ are coupled into the ribbed waveguide 10 over one of its end faces, for example, end face 101. These wavelengths are then conducted along the waveguide 10, as indicated by the arrow to the gratings 110 and 120.

The ribbed waveguide 10 is curved so that, for a defined wavelength, for example wavelength $\lambda_0$, the energy emitted at an angle $\alpha_0$ is focused onto a focal point $F_0$, at which a detector or the end of a waveguide, for example a fiber, can be arranged. The curve shape, that performs this for equal distance grating furrows along the ribbed waveguide 10, is the logarithmic spiral. Its origin is the focal point $F_0$ of the radiation at the defined wavelength $\lambda_0$. The logarithmic spiral is always intersected at the same angle by the rays proceeding from the origin $F_0$.

The wavelength differing from the defined wavelength $\lambda_0$, for example, the wavelengths $\lambda_1$ and $\lambda_2$ are focused at other focal points $F_1$ or, respectively, $F_2$. Detectors may be arranged at these two focal points $F_1$ and $F_2$ or an end of a light waveguide can also be arranged at these focal points.

The arrangement shown in FIG. 1 can be manufactured in InGaAsP, for example, in the following method.

A substrate 1 of InP is provided. Then, a first layer 2, having a thickness of 0.7 $\mu$m and a content of $In_{0.89}Ga_{0.11}As_{0.24}P_{0.76}$ is epitaxially grown on the substrate 1. An intermediate layer 3, having a thickness of 0.2 $\mu$m and being of a material InP, is then grown on the layer 2 followed by a third layer 4 of a thickness of 0.2 $\mu$m and containing material $In_{0.89}Ga_{0.11}As_{0.24}P_{0.76}$, which is the same as the first layer 2. Finally, a cover layer 5 of a thickness of 0.2 μ of InP is then formed on the third layer. Each of these layers, as mentioned, is epitaxially grown. The first or inner layer 2, the intermediate layer 3 and the third or outer layer 4 form a layer packet or group of layers having a thickness D, which is 1.1 μm. The three layers of the packet are monomode.

Figure 2A:
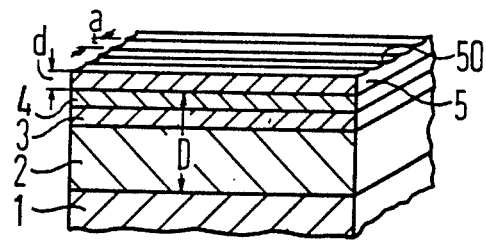
FIGS. 2A-2E are perspective cross sectional views showing five method steps in the manufacture of the arrangement of FIG. 1.

The cover layer 5 is etched in a known technological manner to form a surface grating 50 on an outer surface thereof. This then forms the device as illustrated in FIG. 2A.

Figure 2B:
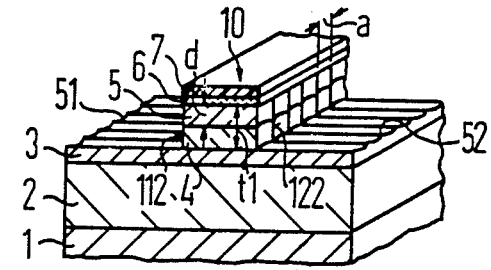

In the next step an $Al_2O_3$ layer is applied to this surface grating 50 as a dry etching mask. Next, a photoresist strip 7 having a width, for example, of 1 μm is photolithographically generated on the surface of the $Al_2O_3$ layer and is then wet-chemically etched to transfer the shape of the lithographically formed photoresist strip 7 onto the $Al_2O_3$ layer so that a strip 6 of $Al_2O_3$ arises that is covered by the photoresist strip 7, as illustrated in FIG. 2B.

By dry etching, for example with an $N_2$ ion beam, the shape of the strip 6 of $Al_2O_3$ is then transferred to the cover layer 5 by removing the exposed portions of the cover layer. In addition, portions of the third layer 4 will be etched away by the ion beam etching, and these parts of the surface grating 50 not covered by the strips 6 and 7 are, thus, exposed and transferred to the depth T1, which is a sum of the thicknesses of the third layer 4 and the cover layer 5. The surface grating is, thus, transferred to the side walls of the remaining portions of the layers 4 and 5 and form the longitudinally limiting surfaces of a rib defined by the strips 6 and 7. This method step is illustrated in FIG. 2B. It also should be noted that the grating is also transferred to an exposed upper surface of the intermediate layer 3.

Figure 2C:
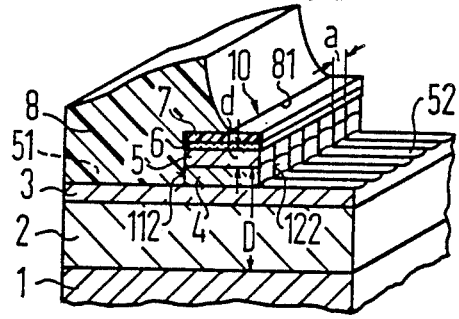

In the next step, a photoresist 8 is then applied and photolithographically structured so that a part or portion 51 of the surface of the grating 50 transferred to the depth T1 is covered with resist 8 at a side at which the focussing is carried out, for example, the side at which the film waveguide 20 of FIG. 1 will join the ribbed waveguide 10. Care must be exercised in this step to see that a boundary 81 of the photoresist 8 lies on the ribbed waveguide 10. This means that the mask of the photoresist 8 must be precisely adjusted to a position of 1 μm, as illustrated in FIG. 2C.

Figure 2D:
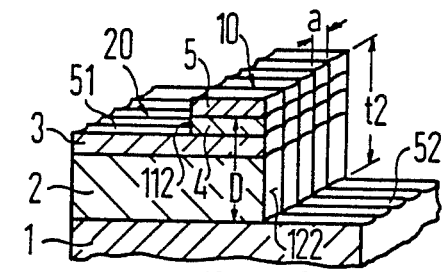

In the next step, the exposed portion of the intermediate layer 3 of InP and the first layer 2 of InGaAsP on the unmasked portion of the ribbed waveguide 10 are eroded by a dry etching process. Subsequently, the entire photo masks 7 and 8 are incinerated and the strip 6 of $Al_2O_3$ is then etched off with a hydrofluoric acid. After this is accomplished, the structure of FIG. 2D will be obtained. In this step, the surface grating is still present in the entire surface of the layer system, but is on different layer portions, depending on what portions of the layer still remain.

Figure 2E:
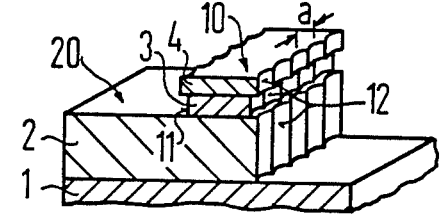

In the next step, the remaining portion of the uncovered or exposed intermediate layer 3 and the remaining portion of the cover layer 5, both of which are of InP, are then removed by a selective etching in a hydrochloric acid to produce the structure illustrated in FIG. 2E. In this final step, a grating is only present on the longitudinal limiting surfaces 11 and 12 of the ribbed waveguide 10 that is defined by the layers 3 and 4 and by the region of the layer 2 lying under these layers. The region of the layer 2 to the left of the waveguide 10 forms the film waveguide 20, which support the ribbed waveguide 10. The remaining grating on the longitudinal limiting surfaces 11 and 12 form the desired gratings 110 and 120.

In one exemplary embodiment, the out-coupling at $\alpha_0 = 45°$ was selected, given a design wavelength of $\lambda_0 = 1550$ nm. The resulting grating constant a for the gratings 110 and 120 amounts to about 280 nm. Given a desired spacing of 4 mm from the focal point $F_0$, the minimum radius of curvature amounts to about 5.6 mm. The length L for the grating required for the out-coupling, likewise, amounts to about 4 mm. The curved shape of the curved waveguide roughly corresponds to a logarithmic spiral. A channel spacing of 5 nm from a spacing of the focal point of 30 μm is possible for such a component. The curve shape of the ribbed waveguide would exactly be a logarithmic spiral if the grating constant a of the grating were constant over the full length L. For a prescribed grating having a chirp, there is an allocated curve shape of the ribbed waveguide so that the same conditions are present, as when using a logarithmic spiral and the grating has a fixed grating constant. This is also inversely true, for example, there is an allocated grating chirp for every curve shape of the ribbed waveguide so that the same conditions, again, likewise, exist.

With reference to the exemplary embodiment, smaller dimensions can also be achieved for the arrangement given greater channel spacing. For a channel spacing of 20 nm, for example, and a 30 μm spacing of the focal points, a spacing of 1 mm from the beginning of the grating up to the apertaining focal point will occur. The radius of curvature at the beginning of the grating is then only 1.4 mm so that the higher refractive index must be selected for the ribbed waveguide in order to avoid emission losses due to the curvature. The necessary coupling length is somewhat diminished at the same time, due to the increase in the coupling efficiency that is involved therewith.

Figure 3:
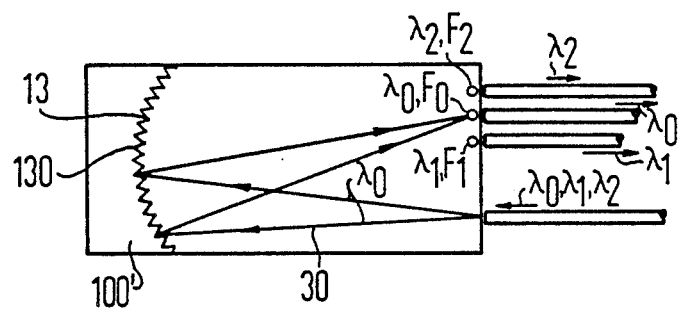
FIG. 3 is a plan view of an arrangement in accordance with the present invention having only a film waveguide.

In FIG. 3, an arrangement, which differs essentially from those of the article from *IEE Proceedings* is illustrated. In this arrangement, an optical film waveguide 30 is applied on the substrate 100' and has a lateral limiting surface defining a step which is produced, for example by etching in which, during the etching, a focusing grating 130 is also etched. This grating is then, preferably, mirrored. In addition, the lateral limiting surface 13 proceeds in a curve in the plane of the film waveguide 30 parallel to the plane of the drawing and, for example, corresponds to a logarithmic spiral. The lateral limiting surface 13 of the grating 130 can be produced in accordance with an etching process, as mentioned hereinabove.

Although various minor modifications may be suggested by those versed in the art, it should be understood that we wish to embody within the scope of the patent granted hereon all such modifications as reasonably and properly come within the scope of our contribution to the art.

We claim:

1. In an arrangement for an integrated optical spectrometer, said arrangement comprising an optical film waveguide extending in a plane and a focusing, optical grating having grating lines extending essentially vertical to the plane of the film waveguide, the improvements comprising the focusing optical grating being fashioned in a longitudinal limiting surface of a ribbed waveguide that defines a step, the film waveguide being adjacent to the ribbed waveguide at least along one side of the ribbed waveguide.

2. In an arrangement according to claim 1, wherein the film waveguide adjacent to the ribbed waveguide is present at only one, and not the other, long side of the ribbed waveguide.

3. In an arrangement according to claim 2, wherein longitudinally limiting surfaces of the ribbed waveguide proceed in a curve essentially corresponding to a section of a logarithmic spiral over at least a length of the grating, and the grating has having a fixed grating constant.

4. In an arrangement according to claim 3, wherein each of the longitudinal limiting surfaces of the ribbed waveguide defines a step and supports a grating with the two gratings residing opposite one another.

5. In an arrangement according to claim 4, wherein both the film waveguide and the ribbed waveguide are monomode.

6. In an arrangement according to claim 1, wherein the ribbed waveguide proceeds along a curve corresponding to a section of a logarithmic spiral for at least the length of the grating, said grating having a fixed grating constant.

7. In an arrangement according to claim 6, wherein each of the longitudinal limiting surfaces of the curved ribbed waveguide define a step and support a grating with the two gratings residing opposite one another.

8. In an arrangement according to claim 6, wherein both the film waveguide and the ribbed waveguide are monomode waveguides.

9. In an arrangement for an intregrated, optical spectrometer comprising a film waveguide and a focusing optical grating on a lateral limiting surface of the film waveguide, said optical grating having grating lines extending essentially vertical to the place of the film waveguide, the improvement comprising the lateral limiting surface of the film waveguide defining a step into which the focusing grating is formed, said lateral limiting surface being a curved surface having logarithmic spiral and lying on the plane of the waveguide.

* * * * *